(No Model.)

C. W. SPURR.
VENEERING.

No. 348,593. Patented Sept. 7, 1886.

Witnesses
S. N. Piper
R. B. Torrey

Inventor.
Charles W. Spurr,
by R. H. Eddy atty.

UNITED STATES PATENT OFFICE.

CHARLES WATERMAN SPURR, OF BOSTON, MASSACHUSETTS.

VENEERING.

SPECIFICATION forming part of Letters Patent No. 348,593, dated September 7, 1886.

Application filed February 11, 1886. Serial No. 191,649. (No model.)

*To all whom it may concern:*

Be it known that I, CHARLES WATERMAN SPURR, of Boston, in the county of Suffolk, and Commonwealth of Massachusetts, have invented a new and useful Improvement in Veneering; and I do hereby declare the same to be described in the following specification, and represented in the accompanying drawings, in which—

Figure 1:
Figure 2:
Figure 3:

Figures 1, 2, and 3 indicate transverse sections of veneering made in accordance with my invention, the nature of which is defined in the claims hereinafter presented. Fig. 1 exhibits the veneer as plain, or not molded or embossed, while in Fig. 2 it is shown as molded or embossed. Fig. 3 represents it as molded and having the interstices of its backing filled, as hereinafter described.

The said veneering is composed of sheets or veneers of the wood veneer laid in pack and united by vulcanized rubber, in very thin sheets, extending between them, there being fixed to one of the outermost veneers, by vulcanized rubber or rubber cement, a backing of card-board, cloth, or other suitable material.

In the said drawings, $a$ and $c$ denote two thin wood veneers, $b$, the vulcanized rubber connecting them, while $e$ is the backing, and $d$ the vulcanized rubber joining such backing to the veneer $c$.

I do not confine my invention to two wood veneers only, as three or more may be used in pack and connected by vulcanized rubber arranged between their next adjacent surfaces and upon the surface to which the backing is fixed by such rubber.

In manufacturing the veneering or combination described, I first use between the surfaces to be connected a vulcanizable rubber or cement, and after having spread it on such surfaces, or properly applied it thereto, and laid the whole together in pack, I expose the pack to heat, or a temperature such as will vulcanize the rubber or cement. The grain of one veneer I generally extend across that of the next one to it, in order to strengthen them, so as to prevent them from cracking under the high temperature to which they may be subjected in the vulcanizing process. Prior to subjecting the pack to such process, I generally press it in a suitable mold or molds or between dies to impart to it any desirable ornamental appearance, in some cases causing it to be more or less convex on the outer face and correspondingly concave on the inner face of the pack. The said pack having thus been molded, embossed, or ornamented is to be heated to the proper temperature for vulcanizing the rubber or rubber cement. The article or new manufacture thus produced will not only be very pliable, but water-proof, so that it can be fixed by glue or cement to a surface to be veneered without danger of the glue, or moisture, therefrom striking through the veneers and staining or otherwise injuring the outer surface of the outermost one.

In some cases I fill the interstices in the backing, as shown at $f$ in Fig. 3, with some suitable material, as filaments of cotton—for instance, glued or cemented together and to the backing in order to impart to it on its rear face a plain flat surface.

The veneering thus produced can be employed to great advantage in finishing and ornamenting walls or furniture.

I claim—

1. As a new or improved manufacture, veneering, substantially as described, consisting of thin veneers of wood arranged in pack and connected by vulcanized cement or india-rubber arranged between them, essentially as set forth.

2. Veneering consisting of thin veneers of wood and a backing of other material arranged in pack and connected by vulcanized cement or india-rubber extending between their next contiguous surfaces, as set forth.

3. Veneering, substantially as described, molded or embossed, as specified, and consisting of thin veneers of wood, or such, and a backing of the same or of other material arranged in pack and connected by vulcanized cement or india-rubber extending between their next contiguous surfaces, as set forth.

4. Veneering, substantially as described, molded as specified, and consisting not only of thin veneers of wood, or such, and a backing arranged in pack and connected by vulcanized cement or rubber extending between their next contiguous surfaces, but of an auxiliary backing or fillings, essentially as described, inserted in the cavities or interstices of the primary backing, essentially as explained.

CHARLES WATERMAN SPURR.

Witnesses:
R. H. EDDY,
S. N. PIPER.